US012711729B1

(12) United States Patent
Cornaby et al.

(10) Patent No.: US 12,711,729 B1
(45) Date of Patent: Aug. 18, 2026

(54) METHODS AND ARRANGEMENTS FOR REDUCING SUPERFLUOUS NETWORK TRAFFIC IN DISTRIBUTED IMAGE PROCESSING SYSTEMS

(71) Applicant: DMRC LLC, Beaverton, OR (US)

(72) Inventors: Colin P. Cornaby, Portland, OR (US); Emma C Sinclair, Portland, OR (US); Ajith Mulki Kamath, Beaverton, OR (US); H. Sprague Ackley, Portland, OR (US); Matthew Laidlaw, Portland, OR (US)

(73) Assignee: DMRC LLC, Beaverton, OR (US)

( * ) Notice: Subject to any disclaimer, the term of this patent is extended or adjusted under 35 U.S.C. 154(b) by 265 days.

(21) Appl. No.: 18/366,501

(22) Filed: Aug. 7, 2023

Related U.S. Application Data

(60) Provisional application No. 63/395,621, filed on Aug. 5, 2022.

(51) Int. Cl.
*G06V 10/44* (2022.01)
*G06T 1/00* (2006.01)
(Continued)

(52) U.S. Cl.
CPC ........... *G06V 10/44* (2022.01); *G06T 1/0021* (2013.01); *G06T 3/40* (2013.01); *G06T 7/11* (2017.01); *G06V 10/764* (2022.01)

(58) Field of Classification Search
CPC ..... G06T 2201/0052; G06T 2201/0065; G06T 1/0028; G06T 2201/0051;
(Continued)

(56) References Cited

U.S. PATENT DOCUMENTS 6,483,927 B2 11/2002 Brunk
6,580,809 B2 6/2003 Stach
(Continued)

OTHER PUBLICATIONS

Fridrich, et al, Rich models for steganalysis of digital images, IEEE Transactions on Information Forensics and Security, vol. 7, No. 3, pp. 868-882, May 2012.
(Continued)

*Primary Examiner* — Alex Kok S Liew
(74) *Attorney, Agent, or Firm* — Klarquist Sparkman, LLP

(57) ABSTRACT

Digital watermarking and advanced image signal processing. One claim recites a method comprising the acts: receiving first imagery depicting an object viewed by a camera of a wireless device; using software on said wireless device, retrieving instructions, including compiled binary object code, from a remote repository, and executing said retrieved instructions to perform acts including: (A) deriving multiple features corresponding to multiple different pixel blocks of image data from the received first imagery; (B) identifying a first block of image data that has a highest likelihood of including a watermark reference signal as indicated by said features; and (C) evaluating whether data corresponding to the identified first block of image data merits transmission to and processing at a remote server, and concluding it does merit said transmission and processing; preparing data corresponding to said first block of image data; sending the prepared data to the remote server, and receiving information from a server in response; and displaying, on a screen of the wireless device, data corresponding to said received information. Other claims and combinations also provided.

28 Claims, 3 Drawing Sheets

(51) Int. Cl.
*G06T 3/40* (2006.01)
*G06T 7/11* (2017.01)
*G06V 10/764* (2022.01)

(58) Field of Classification Search
CPC ........... G06T 2201/0061; G06T 1/0064; G06T 1/0071; G06T 1/005; G06T 1/0021; G06T 2201/0202; G06T 2201/0083; G06T 2201/0064; G06T 2201/0601; G06T 2201/0053; G06T 1/0078; G06T 1/0092; G06T 1/0085; G06T 2207/20021; G06T 2207/20048; G06T 2207/20081; G06T 2207/30244; G06T 3/02; G06T 7/32; G06T 7/74; G06T 1/0035; G06T 2200/36; G06T 2207/30144; G06T 7/0002; G06T 1/0014; G06T 2207/10024; G06T 2207/10048; G06T 2207/20084; G06T 2207/30108; G06T 7/0004; G06T 7/90; G06T 2200/28; G06T 2201/005; G06T 1/0042; G06T 1/0057; G10L 19/018; G10L 19/02; G10L 19/008; G10L 19/022; G10L 21/00; G10L 19/06; G10L 25/18; H04N 21/8358; H04N 2201/3233; H04N 21/23892
See application file for complete search history.

(56) References Cited

U.S. PATENT DOCUMENTS 6,590,996 B1 7/2003 Reed
6,631,198 B1 10/2003 Hannigan
6,724,914 B2 4/2004 Brundage
6,865,747 B1 * 3/2005 Mercier ............ H04N 21/4408 386/346
7,688,996 B2 3/2010 Bradley
8,687,839 B2 4/2014 Sharma
8,977,571 B1 * 3/2015 Bueche, Jr. ........ G06V 30/2253 705/45
9,521,291 B2 12/2016 Holub
9,544,516 B2 1/2017 Rhoads
9,819,950 B2 11/2017 Boles
9,858,681 B2 1/2018 Rhoads
9,959,587 B2 5/2018 Sharma
10,242,434 B1 3/2019 Holub
10,515,429 B2 12/2019 Rhoads
11,250,535 B1 2/2022 Bai
11,257,198 B1 2/2022 Holub
11,410,263 B1 8/2022 Rhoads
2002/0083324 A1 * 6/2002 Hirai ..................... G06T 1/0028 713/176
2002/0159614 A1 * 10/2002 Bradley ................ G06T 1/0021 382/100
2003/0091213 A1 * 5/2003 Yamakage ............. H04N 7/025 348/E7.024
2003/0128861 A1 * 7/2003 Rhoads .............. H04N 1/32304 707/E17.112
2004/0071311 A1 * 4/2004 Choi ..................... G06T 1/0071 382/100
2009/0257618 A1 * 10/2009 Tapson .................... G06T 1/005 382/232
2010/0325117 A1 * 12/2010 Sharma ................... G06F 18/22 707/753
2016/0026729 A1 * 1/2016 Gil .......................... H04L 67/12 715/234
2018/0270388 A1 * 9/2018 Gharaibeh ......... H04N 1/32309
2019/0332840 A1 10/2019 Sharma
2021/0067842 A1 * 3/2021 Revital ............... G06F 21/1063
2021/0299706 A1 9/2021 Filler
2023/0037566 A1 2/2023 Evans

OTHER PUBLICATIONS

U.S. Appl. No. 63/395,621, filed Aug. 5, 2022.

* cited by examiner

| BLOCK 26<br>Score1=608<br>Score2=421 | BLOCK 27<br>Score1=974<br>Score2=263 | BLOCK 28<br>Score1=409<br>Score2=224 |
|---|---|---|
| BLOCK 42<br>Score1=917<br>Score2=394 | BLOCK 43<br>Score1=877<br>Score2=790 | BLOCK 44<br>Score1=42<br>Score2=32 |
| BLOCK 58<br>Score1=546<br>Score2=249 | BLOCK 59<br>Score1=800<br>Score2=76 | BLOCK 60<br>Score1=988<br>Score2=210 |

METHODS AND ARRANGEMENTS FOR REDUCING SUPERFLUOUS NETWORK TRAFFIC IN DISTRIBUTED IMAGE PROCESSING SYSTEMS

RELATED APPLICATION DATA

This application claims the benefit of U.S. Provisional Patent Application No. 63/395,621, filed Aug. 5, 2022, which is hereby incorporated herein be reference in its entirety.

SUMMARY

It is desirable to interact with digitally-watermarked objects using a handheld device, such as a smartphone. In the past, one of two approaches has generally been followed.

In a first approach, the smartphone acts essentially as an input-output device. It captures an image of an object, such as a printed package or a textured container, and sends the image to a remote server. The remote server processes the received image to decode a plural-symbol payload, and may use this payload to look up associated metadata. The server returns the payload, or metadata, to the smartphone, which presents such information on a display screen.

In a second approach, the smartphone performs the just-noted image capture and data display functions, and additionally performs the image processing needed to decode the plural-symbol payload from the captured imagery. (This payload may be sent from the phone to a remote database to obtain metadata corresponding to the payload, which metadata is then returned to the phone for display.)

Distributed image processing systems have been proposed, but have not proven satisfactory.

Applicant has found that, in the first approach, the time required to send a captured image (which is typically multiple megabytes in size) from the phone to a remote server is an impediment to responsive operation. Sometimes several seconds elapse before results are returned to the phone for display. The awkwardness of this delay is compounded if the phone captures imagery in a video mode and a stream of multiple images is to be processed.

The second approach provides a speedy response, but it requires the user to identify, download and install watermark reading software, e.g., from an app store, before any interaction can occur. This requirement is a hindrance to the user experience.

Applicant has found that prior attempts at distributed processing (i.e., hybrid arrangements in which some operations are performed on the phone device and others are performed on a remote server) have suffered due to a confluence of circumstances. These include the requirement to identify and install client software on the phone device, the delay involved in sending data to a server, and occasional failures by the server in extracting payload data. When the server fails to extract payload data from sent imagery, the network traffic involved in sending image data to the server (and returning a failure notification) is wasted time and bandwidth, and causes user frustration.

It would be advantageous for users to be able to interact with watermark codes without requiring the user to identify and install reader software, and without superfluous network traffic—with its attendant delays and user frustration.

In one implementation employing aspects of the present technology, imagery of a watermarked object is captured by a smartphone camera. Web browser software on the phone requests and receives instructions, including compiled binary object code, from a remote server. These instructions are executed on the phone to derive multiple features for multiple blocks of image data produced from the captured imagery. From these features, a first block of image data indicated to have a highest likelihood of including a watermark reference signal is identified. A further evaluation is then conducted to determine whether this first block of image data is promising enough to merit transmission of image data to a server for further processing. Data corresponding to this first block is sent to the server, which extracts the payload data and leads to presentation of associated information on the phone display.

By the foregoing evaluation and processing of imagery on the phone, using compiled object code downloaded and executed using browser software, a user is provided a snappy experience, but without the requirement of first locating and installing a watermark reading app.

These and other features and advantages of the present technology will be more readily apparent from the following detailed description, which proceeds with reference to the accompanying drawings.

DETAILED DESCRIPTION

Review of Digital Watermarking

Before proceeding further, it is helpful to review certain aspects of an illustrative digital watermark technology. In the illustrative technology, a digital watermark pattern can comprise a square block of image data that is tiled edge-to-edge with other such blocks to span an arbitrary area. Each block represents two signal components: a payload signal (sometimes termed a message signal), and a reference signal (sometimes termed a synchronization signal). Often, the watermark pattern comprises a low amplitude component within other imagery (e.g., label artwork).

The payload signal can comprise a 2D array of size, e.g., 128×128, each element of which has a bitonal value representing a "0" or "1" value. The array can be rendered at a desired scale, e.g., so it spans an area of one centimeter or one inch on a side. This 128×128 array redundantly encodes payload data, which may comprise, e.g., 40 or 100 binary bits.

Figure 1:
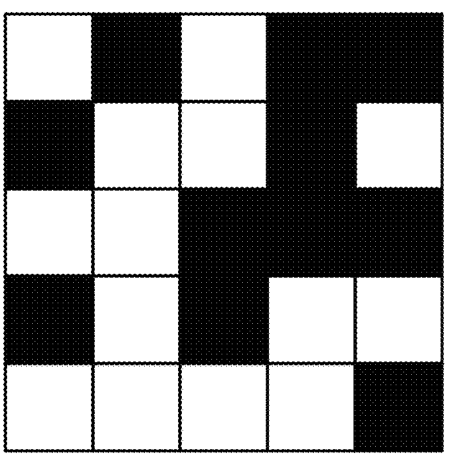
FIG. 1 shows an excerpt of an illustrative watermark payload signal.

FIG. 1 shows a small excerpt from an illustrative 128×128 payload signal array.

The reference signal is a known pattern that is summed with the payload signal, and permits watermark reading software to sleuth the geometric distortion (affine state) at which the payload signal is present in captured imagery.

An illustrative reference signal is a summation of many 2D spatial sinusoids of different frequencies and phases, e.g., 16, 32 or 64 sinusoids. Integer frequencies are desirably used, to permit seamless tiling of a watermark pattern block across an arbitrarily large area of a substrate. When imagery depicting such pattern is transformed into a spatial frequency domain (e.g., by a fast Fourier transform), the individual sinusoid components each appears as a peak, or impulse, in the (u,v) plane. Collectively, a distinctive constellation of peaks representing the reference signal is formed.

The scale and rotation at which this constellation of peaks is found in captured imagery reveals the scale and rotation of the watermark pattern, and thus the scale and rotation of the 128×128 payload signal component. The phase angles at which the peaks appear in the captured imagery reveal the x- and y-translation of the watermark pattern, and thus the translation of the 128×128 payload signal component. Knowing the scale, rotation and translation (sometimes collectively known as the affine state, or pose state) of the 128×128 payload signal component within the captured imagery permits a decoder to geometrically sync to and decode the payload signal, yielding the 40 or 100 bits of payload data.

Figure 2A:
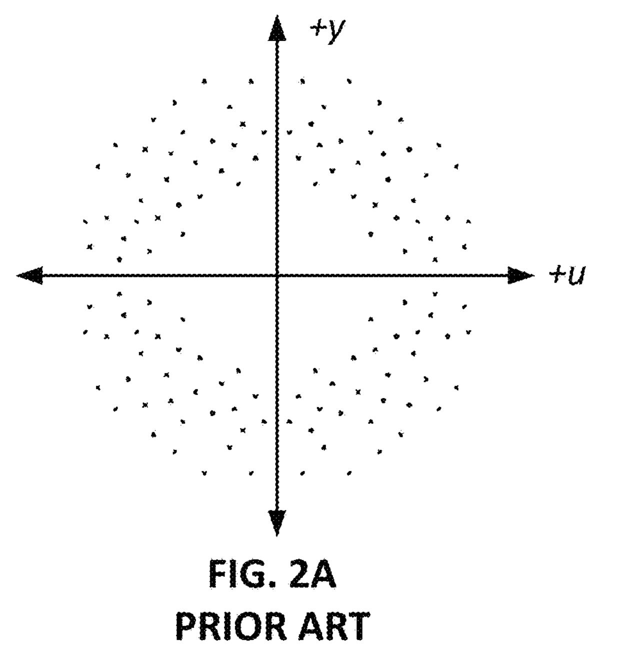
FIGS. 2A and 2B depict an illustrative watermark reference signal, in the spatial frequency domain, and in the spatial (pixel) domain.
Figure 2B:
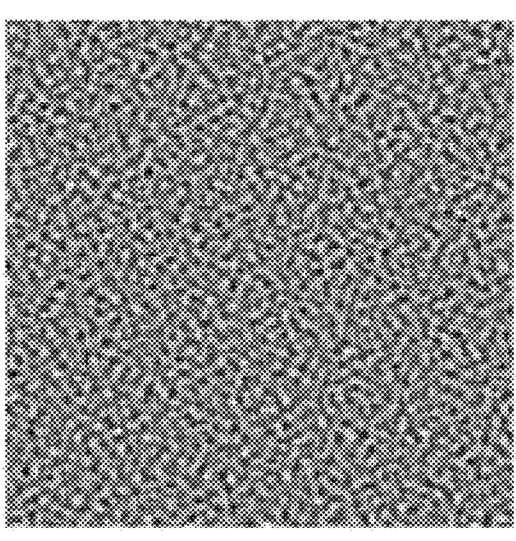

FIG. 2A shows a sample reference signal in the spatial frequency domain, illustrating its distinctive constellation of peaks. FIG. 2B shows the same reference signal represented in the pixel domain.

The 128×128 payload signal component of an illustrative watermark signal starts with a binary payload message, e.g., of 47 bits, which is concatenated with 24 corresponding CRC bits, and then convolutionally-encoded with a base rate of 1/13 to yield a series of 924 bits. A 5 bit protocol identifier, repeated 20 times, is appended as 100 further bits, yielding 1024 "signature" bits. Each of these signature bits is modulated with a 16-element bipolar {+1/−1} noise sequence, yielding 16 bipolar "chips." Each of these chips is mapped to a different location within a 128×128 location array by data in a scatter table (i.e., one "chip" for each of the 16,384 locations).

The reference and payload signals are combined by first computing the reference signal value at 16,384 uniformly-spaced points corresponding to the 128×128 message signal array. At each location, a weighted sum is formed between the reference signal value (which may be a floating-point number ranging between −1 and +1) and the chip value (−1 or +1) at each point. An 8:1 weighting is exemplary, with the reference signal dominating. The resultant weighted sum can be scaled, e.g., to a range of −1 to +1, to form a "continuous tone" watermark signal. (The signal is termed continuous tone since it is based on a floating-point range of values. However, in some embodiments, the signal can be quantized, e.g., to 8-bit greyscale values centered at 128.) More generally, a continuous-tone watermark signal is one in which the 128× 128 array of summed watermark element ("waxel") values are not simply binary; there are one or more intermediate values between the highest and lowest waxel values.

From such a continuous tone watermark signal, or its two original components, a corresponding binary watermark pattern can be derived by various techniques.

To extract a watermark payload from captured imagery, the imagery is first analyzed to identify the scale, rotation and translation of the watermark reference signal component-if any. The imagery is then re-sampled in accordance with these affine parameters to yield a 128×128 array that geometrically corresponds to the 128×128 configuration of the original payload signal component. The resampled data can be filtered to accentuate the watermark signal, e.g., by oct-axis processing. The filtered data can further be processed to reduce the reference signal component, thereby accentuating the payload signal component. Operations that invert the earlier encoding operations are then performed. That is, locations of the 16 "chips" corresponding to each signature bit are identified from the scatter table data; values for the chips are extracted from these locations; and the extracted values are demodulated with the 16-element noise sequence earlier used to determine the bit state of the corresponding signature bit. After the 1024 signature bits have been thereby identified, the 924 convolutionally-encoded bits are decoded by a corresponding decoder (e.g., Viterbi), yielding the 47 payload bits and the 24 CRC bits. The former bits are checked against the latter, and if they correspond, the 47 bits are output as the decoded watermark payload.

Illustrative Arrangements

In an illustrative arrangement, a user interacts with a smartphone (phone) or other wireless device, and the wireless device interacts with one or more remote web servers.

Figures 3, 4:
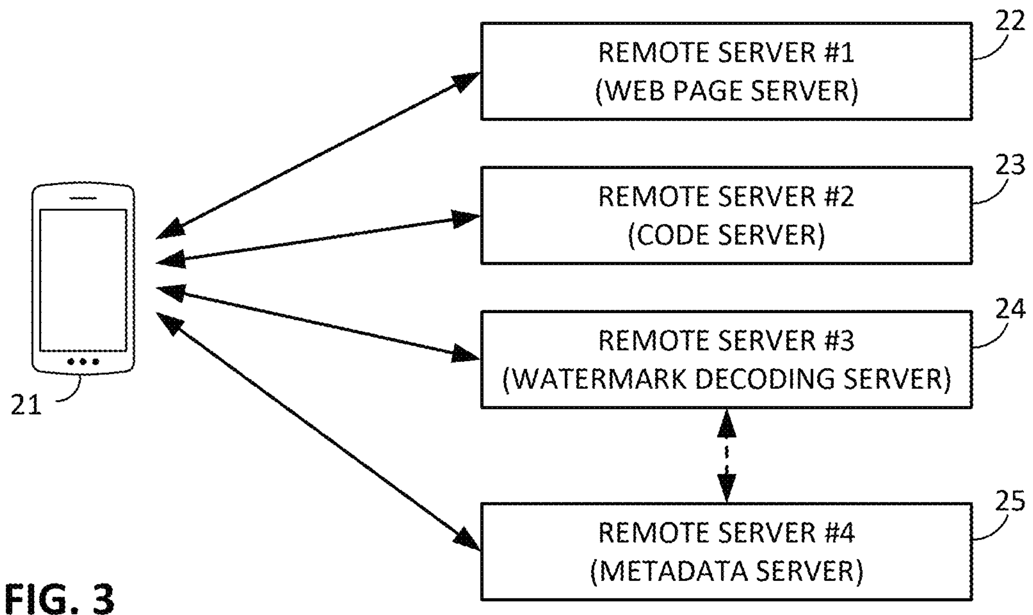
FIG. 3 shows elements of an illustrative embodiment employing aspects of the present technology.
FIG. 4 shows an excerpt of phone-captured imagery, indicating image blocks, and feature scores derived from the blocks.

Referring to FIG. 3, in a particular embodiment, the user employs a smartphone 21 to navigate to a web address by clicking a link in a document, web page, or otherwise. The phone's browser software sends a request to the web address indicated by the link, and a remote web page server 22 responds with web page code, such as HTML. The browser software on the phone interprets the received code and renders a web page on the phone display.

Included in the rendered web page is a button, link or other control that the user can touch (or otherwise select) to read a digital watermark. Touching this button directs the phone's web browser to request watermark client code from a remote server 23. This code desirably includes compiled binary object code, such as WebAssembly code.

Apple Safari, Google Chrome, and other browsers now provide a virtual machine runtime environment for WebAssembly code (Wasm). Wasm is a low level assembly-like language that runs on the phone's processor(s). Higher level languages such as C and C++ can be compiled to Wasm using the Emscripten and Cheerp compilers, among others. Wasm is capable of calling JavaScript functions, and vice versa.

Code downloaded to the phone from server 23 opens a connection to the phone camera, and captures an image frame. (WebRTC can be used for this interface, employing JavaScript.) This image frame is processed by the Wasm code, e.g., to assess different parts of the captured image frame for likely-presence of a watermark signal. If a suitably-promising excerpt of the imagery can be found, associated data is sent to a remote server 24 for watermark decoding. Watermark payload data extracted by server 24 can be used to access metadata related to the payload from a database in a further server 25.

The processing conducted on the phone is sometimes termed "frontend" processing; the processing conducted on the server 24 is sometimes termed "backend" processing.

The following discussion details operations that may be performed in the frontend processing in a first exemplary embodiment. In different embodiments, some of these operations may be omitted or different.

The phone camera provides a frame of RGB imagery. This frame may be 3000×2000 (3K×2K) pixels in size. The image is converted to a greyscale (monochrome) counterpart of the same size.

Different blocks of image data are identified from the greyscale image. Each block may be square, e.g., of size 128×128 or 512×512 pixels. These blocks can be arranged in edge-to-edge fashion, tiling the 3K×2K greyscale image.

In other implementations, the blocks can be arranged to overlap, or they may be tiled with gaps between them. In still other arrangements, blocks can be chosen, randomly or by a rule, from within the 3K×2K greyscale image. An exemplary rule choses five blocks: one block from the center of the image frame, together with blocks from the centers of the upper-left, upper-right, lower-left, and lower-right quadrants of the frame. In some implementations, blocks are placed at locations in the image frame having the highest contrast, strongest edges, or other image feature.

Each block can be processed with a filter to produce a counterpart block in which any watermark signal is relatively accentuated, by relatively attenuating low frequency image components. Non-linear filtering, such as by oct-axis processing, can be used for this purpose.

The filtered blocks are next analyzed to derive features by which blocks likely to include a watermark reference signal can be identified. Such analysis can be done in stages. A first stage may discard from consideration any block that lacks spatial variation (e.g., it is all-black, or all-white, or other constant color) or that otherwise has an attribute indicating a likely lack of watermark signal.

One useful feature is the blocks' spatial frequencies. Each filtered block can be converted to a spatial frequency domain image representation, e.g., by a 2D FFT. Resulting spatial frequency data can then be analyzed to determine presence of spatial frequencies that might be geometrically-distorted counterparts of the watermark reference signal. Various approaches can be used-singly or in combination.

In one approach, an impulse matched filtering procedure is used to determine a scale and rotation of a block's spatial frequency representation that best matches the constellation of spatial frequency impulses of the watermark reference signal.

In another approach, a direct least squares method is used to iteratively adjust scale and rotation of a block's spatial frequency representation so as to best match the constellation of spatial frequency impulses of the watermark reference signal.

In both approaches, Fourier magnitude correlation can be used to assess the degree of the match. In one particular implementation, a Fourier magnitude correlation is computed at each of the spatial frequencies comprising the reference signal constellation. Each correlation is normalized to a range of, e.g., 0-2, and these normalized correlation values are summed. The resulting value is sometimes termed a reference pattern strength metric.

If both techniques are used, each yields scale/rotation data indicating the geometrical transform by which a possible watermark reference signal is present in the image block. Each is associated with a Fourier magnitude correlation indicating the degree of match between the transformed reference signal and the image block. The higher of the two Fourier magnitude correlations, and the geometrical transform data with which it is associated, can be used in subsequent processing.

At this point, a first score (feature) can be produced relating to the likelihood of detecting the watermark reference signal in the image block. This score can be as simple as the sum of the Fourier magnitude correlation value associated with the determined scale/rotation state. Alternatively, the score can be based on these correlation values in relation to neighboring correlation values (i.e., at slightly different values of scale and/or rotation), with each correlation being adjusted for its "peakiness." That is, if the correlation diminishes rapidly with changes in scale and/or rotation from their determined values, then the score is increased.

The just-detailed embodiment derives a feature (based on Fourier magnitude correlation) indicating similarity between spatial image frequencies in an image block and spatial image frequencies of a scaled/rotated watermark reference signal. In a variant embodiment, a second, different feature is employed. This second feature indicates similarity between phase angles of spatial image frequencies in an image block and phase angles of spatial image frequencies of a scaled/rotated watermark reference signal.

In this variant embodiment, the greyscale 128×128 or 512×512 pixel image block is processed a second time. The image block is initially processed to invert the scale/rotation state identified in the foregoing operation. Bilinear interpolation can be used. The rotated/re-scaled pixel image block can then be oct-axis filtered. The image data is next transformed into the spatial frequency domain. A phase deviation process is then employed to estimate the x- and y-translation of the spatial domain image block that yields phases, at the reference signal spatial frequencies, that best match those of the watermark reference signal. A further operation can be employed to refine this translation estimate. At this point, a second score is computed to indicate the aggregate phase deviation between the watermark reference signal frequencies, when scaled, rotated, and x/y-translated as computed, and corresponding spatial frequency signals in the image block. This is termed a phase deviation metric.

In the illustrative arrangement, features as just described are computed for each of multiple blocks in the input imagery. Multiple first scores are thereby produced. In the variant embodiment, multiple second scores are also produced. A single block is then identified as the "best block," based on having the best first score, the best second score, or the best weighted sum of first and second scores.

Although the best block (in terms of watermark reference signal detection prospects) can be identified by the foregoing process, it may be the best block among poor choices. The phone device processor (i.e., under control of the instructions downloaded from server 23) next determines whether data for this identified best block is promising enough to merit transmission to server 24 for backend processing, i.e., to attempt to decode a watermark payload from the block.

Different processes can be used to evaluate whether the best block merits processing by server 24.

One evaluation process simply applies a threshold test to the first score, to the second score, or to a weighted sum of the first and second score. If the score is higher than the threshold, then the best block is regarded as promising enough to send to the remote server.

To illustrate, consider FIG. 4, which depicts a fragment of captured imagery showing multiple blocks. For each block, both first and second features are determined, here indicated as Score1 and Score 2. (These scores are arbitrarily scaled to have values between 0 and 1000.) The bold block in the center is identified as the best block, because it has the highest combined score (here an unweighted sum of Score1 and Score2). In the first evaluation process, the best block may be regarded as promising enough to send data to server 24 for decoding, because the combined score of the best block exceeds a threshold value, such as 1500.

Applicant has found that sometimes such a threshold-exceeding score can occur without a watermark reference signal being present-just as a statistical aberration. To guard against such event, a second evaluation process can be used instead. In this second evaluation process, scores of one or more other blocks are considered. The other block(s) can be one or more of the spatially-closest blocks in the image frame to the best block. If a watermark reference signal is present in the best block, it stands to reason that the signal is also present in one or more nearby blocks. Accordingly, scores for one or more blocks that are near the best block can be examined to see if they, too, are high (e.g., that they exceed the earlier-referenced, or a different, threshold value). If so, this indicates the best block's high score is not a fluke, but instead that the block merits further processing.

Returning to FIG. 4, this second evaluation process can examine the eight blocks closest to the best block to determine whether two or more of them each has a combined score exceeding a threshold value of 1100. In the illustrated example, there are three blocks meeting this requirement (to the west, north, and southeast), so in this circumstance the best block is determined to be promising enough to send related data to the remote server 24 for backend processing.

In a variant arrangement, plural scores are again considered in determining whether the best block merits remote processing. However, instead of using scores from one or more blocks that spatially neighbor the best block, scores from one or more blocks that temporally neighbor the best block can be used. That is, if video imagery is being captured, then a score for a block from one or more preceding or following image frames can be used. The phone camera's field of view likely doesn't move much between frames, so a block in a preceding or following frame—at the same location within the frame as the identified best block—can be considered.

In a still different arrangement, applicant has found it advantageous to employ a machine learning approach to evaluate whether the best block merits remote processing. In such arrangement, a supervised learning model is trained with a reference dataset. The dataset is based on imagery captured from (A) objects that are known to include watermark patterns, and (B) objects that are known not to include watermark patterns. For each image, the data includes derived block scores for the best block, and for its spatial neighbors (and temporal neighbors, if available). By training with such a dataset, the model learns to recognize, based on block scores, whether image data is watermarked (and thus likely to be successfully decoded) or whether image data unwatermarked.

Various machine learning models can be employed. Examples include K neighbor classifiers, linear support-vector machine classifiers, Gaussian kernel support-vector machine classifiers, Fisher linear discriminant (FLD) models, convolutional neural networks (CNN), linear regression classifiers, decision tree classifiers, random forest classifiers, Bayesian classifiers (e.g., Gaussian naïve Bayes), etc. Several candidate learning models can be trialed, and the model yielding the best results can be chosen for use.

Trialing of candidate learning models can proceed as follows: A training dataset—including for each test case the block scores (features) derived from the best block and its temporal or spatial neighbors, together with a corresponding ground truth label (watermarked image or unwatermarked image)—is divided into two parts. The first part, amounting to about two-thirds or three-quarters of the dataset, is used to train a particular model (e.g., a random forest classifier). The second part, amounting to the remainder of the dataset, is used to test the model after training. (The dataset typically comprises data for tens of thousands of images, or more.) Test results are logged, indicating the number of false positive outputs from the trained classifier (i.e., the classifier concluding a watermark is present in the case of unwatermarked imagery), and the number of false negative outputs (i.e., the classifier concluding a watermark is not present in the case of watermarked imagery). The same trial is conducted for a second classifier model (e.g., Gaussian naïve Bayes). This trialing process continues for each other candidate classifier model being considered. The model that yields the best results (which may be judged based on false positive count, false negative count, or a weighted combination of the two counts) is then chosen for use. Corresponding code is then adopted for use and is included in the Wasm package of software downloaded to the phone from the code server 23.

Figure 5:
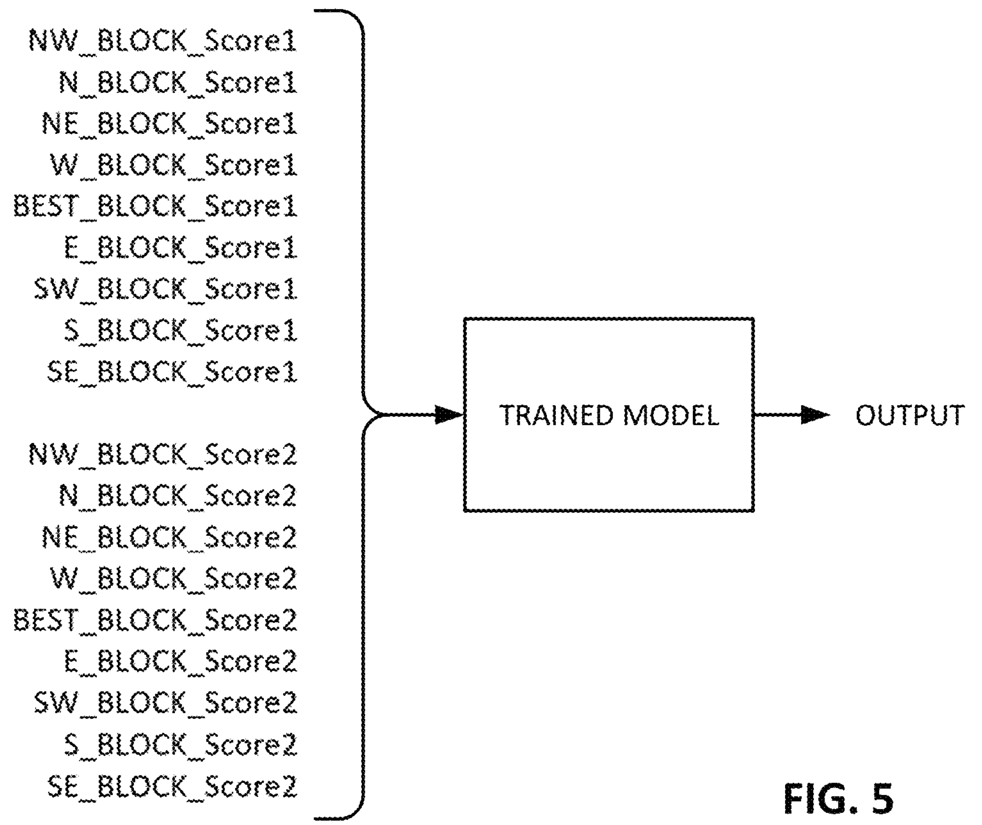
FIG. 5 conceptually illustrates aspects of the technology that employ a trained model to evaluate whether a "best block" merits further processing.

FIG. 5 conceptually illustrates use of the trained model. An ensemble of 18 input data derived from captured imagery is provided to the trained model: first and second feature scores for the best block, and first and second feature scores for each of the eight blocks closest to the best block. The model was earlier trained with such data, together with ground truth information (watermark present or not), so the trained model reliably predicts whether the input data will produce a successful watermark decode or not.

A classifier comprising such a trained model may produce a binary output, indicating likely presence of a watermark or not. A variant classifier may produce a numeric value indicating an estimated probability of watermark presence, e.g., between 0 and 100%. In the former case, if the model indicates a watermark is likely present, data corresponding to the best block is sent to the watermark decoding server 24 for further processing. In the latter case, if the model outputs a value indicating an estimated probability of watermark presence exceeding a threshold, then data for the best block is likewise sent to server 24 for further processing.

In the just-discussed arrangements that employ a threshold (the simple score-based threshold testing, and the trained classifier variant that outputs a probability score), the threshold can be set empirically so that, e.g., a target of 95% or more (or 99% or more, etc.) of best blocks identified for remote processing, on average, yield successfully-extracted watermark payloads. (Applicant has found that the simple threshold testing approach has much more randomness, in predictive value, than the trained model approach. Thus, the former approach can sometimes yield results below the target for extended periods, before the law of large numbers takes over and causes average results to eventually trend towards the 95% or 99%, etc., targeted performance value. The latter approach more reliably meets the targeted performance.)

The above-detailed processes for evaluating whether to send the best block to the server 24 are generally based on features indicating that the best block contains the expected watermark reference signal. A different evaluation process can instead be based on features indicating that the best block contains expected payload data.

Recall that the illustrative payload signal includes 100 bits for a watermark protocol identifier. In the illustrative watermark, this identifier is five bits, repeated 20 times. Each of the 100 bits is modulated with a 16-bit noise sequence, and 1600 resultant "chips" are spread to locations through the 128×128 payload signal array, in accordance with data in the scattering table.

Commonly, the protocol identifier for the expected watermark signal is known. In such case, the chip values at 1600 locations in the payload signal array are also known; they are fixed in accordance with the five bit identifier, the 16-bit noise sequence, and the scattering table data. The phone can evaluate whether to send the best block for backend processing based on examination of some or all of the corresponding 1600 locations in the best block to determine the extent to which they agree with the expected values.

In one such evaluation process, the phone inverse-transforms the greyscale best block per the scale, rotation and translation parameters determined earlier, and applies oct-axis filtering. (The reference signal component can be subtracted from this data, since its purpose has been fulfilled and we now are interested just in the payload signal component.) Values at the 1600 known locations in the resulting array are examined to extract the chip value at each location. This involves comparing the value at one of the known locations to values at surrounding locations in the payload signal array, to determine whether the value at the known location is above or below the average of the surrounding locations-thereby indicating whether the chip at this location has a first or second binary value. The 1600 binary chip values thereby extracted are then examined to determine whether they correspond, with a sufficiently improbable likelihood, to the 1600 expected chip values. If so, data for the best block is sent to server 24 for backend process; else, not.

Statistical improbability can be assessed using the binomial distribution. If there is no watermark payload encoded in the block, then the binary chip values extracted at the 1600 known locations can be modeled as random functions of two values, each with equal probabilities. On average, 800 locations would be expected to have the first value, and 800 would be expected to have the second value.

Just as the probability of flipping a coin 10 times and coming up with 8 or more heads can be computed (5.5%), so can the probability of a chance-caused match at any number of the 1600 known locations be determined. For example, the random chance of a match between extracted and expected chip values at 863 or more of the 1600 locations is less than 0.1%. If this degree of correspondence is found between the extracted and expected values among the 1600 locations, then 999 times out of a thousand, such an occurrence is likely not due to chance, but to presence of the watermark protocol identifier in the best block.

The degree of statistical improbability required before data is sent to the remote server can be set by the system designer based on requirements of a particular application.

In a different evaluation process based on these 1600 known chip values, a confidence assessment is made for each extracted chip value, based on the difference value between the known location value and the average value at surrounding locations. The greater this difference value, the more confident the determination of binary chip value at that known location. A sum can then be computed, across each known bit location where the correct chip value is extracted (i.e., matching the chip value expected at that known location). The resulting sum can then be tested against a threshold value to determine whether the chip values extracted from the processed best block at the known locations match expected values with an aggregate confidence value that exceeds a target.

If evaluation, by any of the foregoing processes, leads to a conclusion that further processing of best block data is merited, then data corresponding to the best block is sent to server 24 for attempted watermark decoding.

The actual data sent to server 24 can vary depending on particular implementation. It can be an excerpt of the originally-captured color imagery that includes the best block, or it can be a greyscale counterpart of such excerpt. Often, however, derivative data is prepared from the color or greyscale imagery, and this derivative data is sent.

For example, color or greyscale imagery can be transformed to invert the scale, rotation, and/or translation of the captured depiction of the watermark code, as revealed in earlier processing, and the transformed data can be sent to the server 24. Any of the foregoing data can also be down-sampled, e.g., by interpolation, to achieve an array of data of a desired size prior to sending. Any of such data can also be non-linearly-filtered, e.g., by oct-axis filtering, prior to sending. Any of such data can be processed to remove the known watermark reference signal, prior to sending. Etc.

In a first exemplary embodiment, the phone sends to server 24 a 128×128 array of oct-axis filtered data. The phone prepares this data by converting, to greyscale, an excerpt of the captured imagery that encompasses the best block. This greyscale data is then transformed (e.g., using bilinear interpolation) to restore any included watermark signal pattern to its original scale, rotation and translation, to yield a 128×128 pixel array corresponding to a 128×128 waxel array with which the imagery was presumably encoded. This 128×128 pixel array is then oct-axis filtered.

Each of the just-noted operations diminishes the size of the best block data, from its original color representation (24 bits/pixel), to a greyscale representation (8 bits/pixel), to a smaller 128×128 pixel array, and finally to a 128×128 array of oct-axis values. Each oct-axis value can be represented by less than 8 bits. One particular arrangement (oct-axis-9) uses four bits per oct-axis value. As a consequence, the data sent from the phone to the server 24 comprises 128×128×4 bits, or 65K bits, or 8K 8-bit bytes. (Other oct-axis representations employ fewer bits per pixel. E.g., oct-axis-3 employs 2 bits per pixel, and bi-state oct-axis employs a single bit per pixel. See U.S. Pat. No. 10,515,429.)

In a second exemplary embodiment, the phone sends to server 24 a 320×320 array of greyscale image data. The phone produces this data by color-converting the captured imagery to greyscale, and excerpting a 320×320 pixel area centered on the best block. The 320×320 pixel greyscale data comprises 102K bytes of data. Although larger than the resultant data from the first exemplary embodiment, this 102 KB data transmission still happens much faster than the transfer of the originally-captured color image, or of a greyscale counterpart. (The 320×320 size is somewhat arbitrary, but is chosen to be large enough to allow affine transformation and downsampling at the server 24 that results in a final 128×128 data array.)

In this second illustrative embodiment, if the phone has estimated the scale and rotation of a watermark reference signal included in the best block, these parameters can be sent to the watermark decoding server 24 along with the 320×320 pixel image data. Likewise with phone-estimated x- and/or y-translation values. Such parameters can be used by the watermark decoding server as starting points from which refined parameter values can be iterated, e.g., using a direct least squares approach. (The server typically includes an array of processors, such as are available through the Microsoft Azure or Amazon AWS services, and is thus not compute-bound like the phone processor(s).) Alternatively, the server can operate anew from the pixel data, and independently determine the scale, rotation and translation parameters of a watermark reference signal that is possibly-included in the image data.

In a third illustrative embodiment, greyscale image data including the best-block is scaled to reduce its size (i.e., by down-sampling), and the scaled image data is then oct-axis filtered to just one, two, three or four bits per pixel. The resulting data is then sent to the server 24 for backend processing.

It will be recognized that the bit-size of the data sent to the server 24 for processing is typically substantially less than that of the best block in its original form, and is far less than the originally-captured imagery. For example, if the best block is a 512×512 pixel excerpt of the captured color image frame, its original size is 6.3 Mbits. If sent as a 128×128 pixel greyscale image, its size is 131 Kbits. If sent as 128×128 oct-axis-9 data (i.e., 4 bit per location), its size is 65.6 Kbits. If sent as oct-axis-3 data (i.e., 2 bits per location), its size is 33 Kbits.

In an illustrative arrangement, the data is sent to the server 24 as a JSON package—an open standard data interchange format. JSON does not permit control characters (e.g., escape characters), which are commonly included in image data, such as to indicate ends of image rows, etc. Accordingly, the sent data is first encoded into Base64, which represents all 8-bit characters by text counterparts. This encoding enlarges the sent data by about a third. So a 128×128 pixel greyscale image is enlarged from 131 Kbits to 175 Kbits. Nonetheless, the amount of data sent to the server is small in comparison to the original megabytes-sized imagery. Moreover, the JSON file can be compressed by a lossless compression technique (e.g., an LZ77-LZ78- or LZW-based technique) to counteract the enlargement introduced by Base64 encoding. Such compression can sometimes yield a package of data smaller than the original data, i.e., before Base64 encoding.

Generally speaking, applicant aims to send less than 150K 8-bit bytes of data to the server 24, for a best block that passes the evaluation process. Preferable is to send less than half this amount of data, i.e., 75K. Still more preferable is to send still less, such as less than 30K or 10K bytes.

If, as in the first exemplary embodiment, the phone sends to server 24 a 128×128 array of oct-axis values that has been geometrically-transformed to correspond to the original affine state with which the best block was apparently-encoded, then the server can begin immediately to apply a watermark decoding process. If the phone sends data that has not been geometrically transformed, then the server typically begins by processing the data to yield such a geometrically-transformed 128×128 data set. It then undertakes the decoding process.

In nearly all cases, the decoding process is successful in extracting watermark payload data from the sent data, due to the earlier care taken in selecting and scrutinizing the best block by the phone.

If watermark decoding is successful, data related to the captured imagery is returned to the phone. In some embodiments, the server 24 returns the decoded payload data to the phone, which the phone can then present on a display. More commonly, however, the phone takes a responsive action, such as using the payload data to look up related metadata in server 25, and then presenting or acting on the metadata. One such example is where a user employs a phone to image a drink container to access metadata indicating associated nutritional information. Another example is where a user employs a phone to image a package of baked goods to access metadata indicating the product expiration date. Still another example is where a user employs a phone to image a plastic clamshell food container, to obtain metadata indicating the plastic composition and how the container can be recycled. In other examples, the phone responds to the returned payload data by performing one of several different operations depending on the value of the returned payload data. For example, for a certain value of returned payload data, the phone may execute additional WebAssembly code (downloading same first from server 23, if needed).

In other embodiments, the watermark decoding server 24 passes the decoded payload data to a further process or system (instead of returning same to the phone), and the further process or system takes an action using the payload data. This action can be a lookup of information, e.g., by a server 25. Alternatively, the further process can apply an encryption or decryption operation to the payload data (or on metadata looked-up from the payload data). The result of this operation can be returned to the phone for display or action, or it may be input to a further process. This further process may, for example, compare the resultant data against reference data to determine if it matches or corresponds in an expected way. A result of this comparison can then be sent to the phone for display. One application of such technology is where a user images QR and watermark codes on a designer garment to obtain a confirmation that the garment is genuine and not counterfeit.

It will be recognized that embodiments incorporating aspects of the present technology enable users to easily interact with digital watermark codes, without requiring that users first identify and install reader software. Such embodiments provide snappy performance (typically processing 5 frames or more per second; 15 is more typical), and reliably reward users with information based on decoded watermark. Decoding failures by the server 24 are exceedingly rare, so there is virtually no superfluous network traffic.

CONCLUDING REMARKS

Having described and illustrated the technology with reference to exemplary implementations, it will be recognized that the technology is not so limited.

For example, while the detailed embodiments employ browser software on a user's smartphone to execute downloaded binary object code for frontend processing, in other embodiments, different arrangements can be used. For example, a wireless device without browser software can be used as the client device, and downloaded binary object code can be executed otherwise, such as by using the Wasmer runtime environment.

Similarly, while the detailed embodiments send data for a single best block to the remote server 24, in other embodiments, data for plural promising blocks can be sent to the server. Typically, each of these blocks is evaluated and found likely to contain a watermark signal prior to sending.

The illustrative embodiments are but a few of a large variety of alternatives. For example, it will be understood that the particular division of processing between the phone (the frontend processing) and the remote server (the backend processing) can be determined by the system designer based on particular circumstances of the implementation.

The functionality of the watermark decoding server 24 can be combined with that of any of the other servers. Likewise, the functionalities of others of servers 22, 23 and 25 can be combined with each other.

Reference was made to subtracting the reference signal from oct-axis-filtered data. This involves computing the correlation between the 2D spatial domain reference signal and the oct-axis-filtered data, and using the resultant value as a scaling factor to produce a scaled counterpart of the reference signal. This scaled 2D counterpart of the reference signal is then subtracted from the oct-axis-filtered data.

In some embodiments, the camera-captured or monochrome imagery is down-sampled, e.g., by a factor of two or three, before blocks are identified and processed to generate features.

It will be understood that software instructions need not be downloaded anew from server 23 for each captured image frame. Rather, once downloaded, the code is locally available from the phone memory for so long as the browser session is maintained.

The detailed description refers to the phone doing this or that. It will be understood that these are shorthand references to processes involving the phone processor executing code downloaded from server 23.

While the present technology is described in the context of imagery, the same principles can be applied to other media types as well, such as audio. For example, a phone can capture audio and derive features from different frames of the audio (i.e., different temporal excerpts), to identify which audio frame appears most likely to have a watermark. This frame can then be evaluated to determine whether it is promising enough to send to a server for processing. If so, it is sent. As in preferred image-based embodiments, such processing on the phone can be performed by executing instructions that include binary object code that has been downloaded from a remote web server, e.g., in response to a request sent by browser or other software.

The watermarks used in the illustrative embodiments are continuous tone watermarks. Continuous tone watermarks can be of different forms, e.g., in which the pattern is formed in the luminance domain or in the chrominance domain. Sparse (binary) watermarks can also be read using the detailed technology. The frontend processing on the handset is the same as detailed. The backend processing is the same for many types of sparse watermarks, but for Type 3 sparse watermarks, different decoding is employed. Details on this and other aspects of sparse watermarks are found in U.S. publication 20190332840.

Many other types of watermarks exist, and can be used in embodiments of the present technology. Some employ signaling in the wavelet domain.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark (sometimes termed a digital watermark) is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments, the ratio N/K is 0.1 or less. Due to the small base rate, a payload can be decoded from a watermark even if half of more (commonly three-quarters or more) or the code is missing.

As noted, in the illustrative watermarking arrangement, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding 1024 bits. These bits are then scrambled and spread to yield the 16,384 values in a 128×128 watermark signal pattern.

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again, in contrast, synchronization in QR codes is achieved by alignment patterns placed at three corners and at certain intermediate cells. Message data is expressed at none of these locations.

The watermarked objects from which imagery is captured can be, e.g., product packaging or printed media. The watermark pattern can be rendered by printing, e.g., with ink or clear varnish. Alternatively, the watermark pattern can take the form of a surface texture. Texturing can be accomplished by laser etching, thermoplastic molding (e.g., blow molding, injection molding), etc.

Addition details on watermark encoding and decoding is found in U.S. Pat. Nos. 6,590,996, 9,959,587, 10,242,434 and in U.S. patent publications 20190332840 and 20210299706. A commercial software development kit for implementing digital watermark reading is available from Digimarc Corporation as the Digimarc Embedded Systems SDK.

Oct-axis filtering is detailed in U.S. Pat. Nos. 6,580,809, 6,724,914, 6,631,198, 6,483,927, 7,688,996, 8,687,839, 9,544,516 and 10,515,429. Variations that can be used in embodiments of the present technology also include the "freckle" and "oct-vector" transforms, respectively detailed in U.S. Pat. Nos. 9,858,681 and 11,410,263.

Exemplary impulse matched filtering procedures are detailed in above-cited U.S. Pat. Nos. 6,590,996 and 10,242,434. Exemplary direct least squares methods are detailed in above-cited U.S. Pat. No. 9,959,587.

The cited phase deviation metric can be computed per the disclosure of above-cited U.S. Pat. No. 9,959,587. The cited reference pattern strength metric is detailed in U.S. Pat. No. 11,250,535, as is the "peakiness"-adjusted measure, which is termed the linear reference pattern strength score. (This latter metric essentially divides the Fourier magnitude correlation value for each constellation peak by the average of correlation values at the neighboring locations, and the sums across all peaks.)

While the detailed embodiments employ features based on Fourier magnitude correlation, and some embodiments also make use of phase deviation, other features can be used in still other embodiments. Exemplary other features, and their use in indicating likely presence of a watermark reference signal, are detailed in U.S. Pat. Nos. 9,521,291 and 11,257,198, and in the paper by Fridrich, et al, Rich models for steganalysis of digital images, IEEE Transactions on Information Forensics and Security, Vol. 7, No. 3, pp. 868-82, May 2012.

Training of machine learning classifiers is familiar to artisans in the field, so is not belabored here. Some of applicant's previous work involving machine learning classifiers is detailed in U.S. Pat. No. 10,664,722.

Copending U.S. patent application Ser. No. 17/870,629, filed Jul. 21, 2022, details a related system for speeding response of a distributed client-server watermark reading system. The technologies detailed in that application can be incorporated into embodiments of the present technology, and vice versa. For example, the data sent by the phone to the watermark decoding server 24, in embodiments of the present technology, can comprise image data that has been up-sampled and then lossily compressed, as taught in application Ser. No. 17/870,629. (Server 24 would then apply a corresponding decompression process to recover the up-sampled data.)

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nvidia Tegra 4). Implementation can also employ a variety of specialized processors, such as graphics processing units (GPUs, such as are included in the nvidia Tegra series, and the Adreno 530-part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits-including digital, analog and mixed analog/digital circuitry. Execution of the instructions can be distributed among processors and/or made parallel across processors within a device or across a network of devices. Processing of data can also be distributed among different processor and memory devices. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC). Additional details concerning special purpose electronic circuitry are provided in our U.S. Pat. No. 9,819,950.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems-special purpose computer systems in which operating system software and application software are indistinguishable to the user (e.g., as is commonly the case in basic cell phones). The functionality detailed in this specification can be implemented in operating system software, application software and/or as embedded system software.

Although disclosed as a complete system, sub-combinations of the detailed arrangements are also separately contemplated (e.g., omitting various of the features of a complete system).

While aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Moreover, it will be recognized that applicant's technology extends to the server (e.g., web site) from which instructions (e.g., WebAssembly or JavaScript instructions) are downloaded to a user device, for execution by the user device.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

A summary of a few embodiments incorporating aspects of the technology follows:

What is claimed is:

1. A method comprising the acts:

receiving first imagery depicting an object viewed by a camera of a wireless device, said receiving yielding received first imagery;

using software on said wireless device, retrieving instructions, including compiled binary object code, from a remote repository for execution by the wireless device to perform initial digital watermark detection processing, and executing said compiled binary object code on the wireless device to perform initial digital watermark processing including: (A) deriving multiple features corresponding to multiple different pixel blocks of image data from the received first imagery; (B) identifying a first block of image data that has a highest likelihood of including a digital watermark reference signal as indicated by said multiple features, said identifying yielding an identified first block of image data; and (C) evaluating whether data corresponding to the identified first block of image data merits transmission to and processing at a remote server, and concluding it does merit said transmission and processing;

preparing data corresponding to said first block of image data, said preparing yielding prepared data;

sending the prepared data to the remote server, and receiving information from a server in response; and displaying, on a screen of the wireless device, data corresponding to said received information.

2. The method of claim 1 in which said multiple features comprise metrics computed using Fourier magnitude correlation values.

3. The method of claim 1 in which said multiple features comprise linear reference pattern strength scores.

4. The method of claim 1 in which said multiple features comprise phase deviation metrics.

5. The method of claim 1 in which said evaluating comprises testing one or more values of features for said first block of image data against a first threshold.

6. A method comprising the acts:

receiving first imagery depicting an object viewed by a camera of a wireless device, said receiving yielding received first imagery;

using software on said wireless device, retrieving instructions, including compiled binary object code, from a remote repository, and executing said retrieved instructions to perform acts including: (A) deriving multiple features corresponding to multiple different pixel blocks of image data from the received first imagery;

(B) identifying a first block of image data that has a highest likelihood of including a digital watermark reference signal as indicated by said multiple features, said identifying yielding an identified first block of image data; and (C) evaluating whether data corresponding to the identified first block of image data merits transmission to and processing at a remote server, and concluding it does merit said transmission and processing, in which said evaluating comprises testing one or more values of features for said first block of image data against a first threshold, and in which said evaluating also comprises testing a value of a feature for a block of image data that spatially neighbors said first block of image data against a second threshold;

preparing data corresponding to said first block of image data, said preparing yielding prepared data;

sending the prepared data to the remote server, and receiving information from a server in response; and displaying, on a screen of the wireless device, data corresponding to said received information.

7. The method of claim 5 in which said evaluating also comprises testing a value of a feature for a block of image data that temporally neighbors said first block of image data against a second threshold.

8. A method comprising the acts:

receiving first imagery depicting an object viewed by a camera of a wireless device, said receiving yielding received first imagery;

using software on said wireless device, retrieving instructions, including compiled binary object code, from a remote repository, and executing said retrieved instructions to perform acts including: (A) deriving multiple features corresponding to multiple different pixel blocks of image data from the received first imagery; (B) identifying, from among the multiple different pixel blocks, a first block of image data that has a highest likelihood of including a watermark reference signal as indicated by said multiple features; and (C) applying the derived features for multiple blocks of image data, including said first block of image data, to a classifier comprising a trained model to evaluate whether data corresponding to the first block of image data merits transmission to and processing at a remote server, and concluding that the data corresponding to the first block of image data does merit said transmission to and processing at the remote server;

preparing data corresponding to said first block of image data, said preparing yielding prepared data;

sending the prepared data to the remote server, and receiving information from the remote server in response; and displaying, on a screen of the wireless device, data corresponding to said received information.

9. The method of claim 8 in which said trained model comprises a K neighbor classifier, a linear support-vector machine classifier, a Gaussian kernel support-vector machine classifier, a Fisher linear discriminant model, a convolutional neural network, a linear regression classifier, a decision tree classifier, a random forest classifier, or a Bayesian classifier.

10. The method of claim 1 in which said evaluating comprises analyzing the first block of image data for expected values.

11. The method of claim 1 in which said evaluating comprises analyzing the first block of image data using binomial statistics.

12. The method of claim 1 in which preparing the data comprises changing scale and oct-axis filtering of the first block of image data.

13. The method of claim 1 in which preparing the data comprises applying a lossless compression process.

14. The method of claim 1 in which preparing the data comprises encoding said data in a format lacking control characters to yield encoded data, packaging the encoded data as a JSON object, and losslessly compressing the JSON object.

15. The method of claim 1 in which the prepared data corresponds to a 128×128 array of values.

16. The method of claim 1 in which the prepared data corresponds to a 128×128 array of values, each of said values having a bit length of four or less.

17. The method of claim 1 in which the prepared data corresponds to a 320×320 array of values.

18. The method of claim 1 in which the prepared data is a scaled and rotated counterpart of the first block of image data.

19. The method of claim 1 in which the prepared data is a scaled, rotated and translated counterpart of the first block of image data.

20. The method of claim 1 that further includes receiving second imagery depicting an item viewed by said camera, said receiving second imagery yielding received second imagery; executing said instructions to perform: (A) deriving additional multiple features corresponding to multiple different pixel blocks of image data produced from the received second imagery; (B) identifying a particular block of image data that has a highest likelihood of including a digital watermark reference signal as indicated by said additional multiple features; and (C) evaluating whether data corresponding to the particular block of image data merits transmission to and processing at a remote server, and concluding it does not merit said transmission and processing; and not sending said particular block of image data, nor data derived therefrom, to the remote server.

21. The method of claim 1 in which each of said multiple features comprise a score indicating a likelihood that the corresponding block includes a digital watermark reference signal.

22. The method of claim 1 in which the camera captures plural channels of color information, and the data sent to the remote server is monochrome information.

23. The method of claim 1 that includes performing acts (A), (B) and (C) five or more times per second, each time on a different frame of received imagery.

24. The method of claim 1 in which the sending act comprises sending less than 75K bytes of data, representing said first block of image data, to the remote server.

25. The method of claim 1 in which the sending act comprises sending less than 30K bytes of data, representing said first block of image data, to the remote server.

26. The method of claim 1 in which the sending act comprises sending less than 10K bytes of data, representing said first block of image data, to the remote server.

27. The method of claim 8, wherein the retrieved instructions include WebAssembly compiled binary code executed by the wireless device to perform said deriving and said applying.

28. The method of claim 8, wherein the classifier evaluates the multiple features using features corresponding to the first block and one or more spatially or temporally neighboring blocks.

* * * * *